United States Patent [19]

Bastgen

[11] 4,276,168

[45] Jun. 30, 1981

[54] DEVICE FOR DEWATERING SLUDGE

[75] Inventor: Wendel Bastgen, Betzdorf, Fed. Rep. of Germany

[73] Assignee: Alb. Klein GmbH & Co. KG, Niederfischbach, Fed. Rep. of Germany

[21] Appl. No.: 102,423

[22] Filed: Dec. 11, 1979

[30] Foreign Application Priority Data

Feb. 15, 1978 [DE] Fed. Rep. of Germany ....... 2854168

[51] Int. Cl.$^3$ ............................................. B01D 33/04
[52] U.S. Cl. ..................................... 210/396; 210/401
[58] Field of Search ................ 210/396, 397, 400, 401

[56] References Cited

U.S. PATENT DOCUMENTS

| 3,084,987 | 4/1963 | Bounin | 210/401 X |
| 3,800,952 | 4/1974 | Bastgen | 210/400 X |
| 4,181,616 | 1/1980 | Bahr | 210/401 X |

*Primary Examiner*—John Adee

*Attorney, Agent, or Firm*—Hane, Roberts, Spiecens & Cohen

[57] ABSTRACT

Band filter devices for continuously dewatering a suspension, such as sewage sludge comprising an upper filter band stretched between deflection rolls, the upper strand of which forms a filter zone, and a further filter band which together with the lower part or strand of the first band forms a compressing zone. The filter band is stepped at least once in a Z-shaped manner in the filter zone by providing a further deflection roll which is positioned lower than and downstream of the first deflection roll but in a position counter to the direction of transport, and such that between two filter zones there is a zone where the sludge cake is transferred to another part of the band and rearranged. Above the upper strand or part is at least one ram or beam which lies transverse to the direction of transport and the ram can be pressed into the sludge cake to produce transverse grooves or channels in the sludge cake.

6 Claims, 2 Drawing Figures

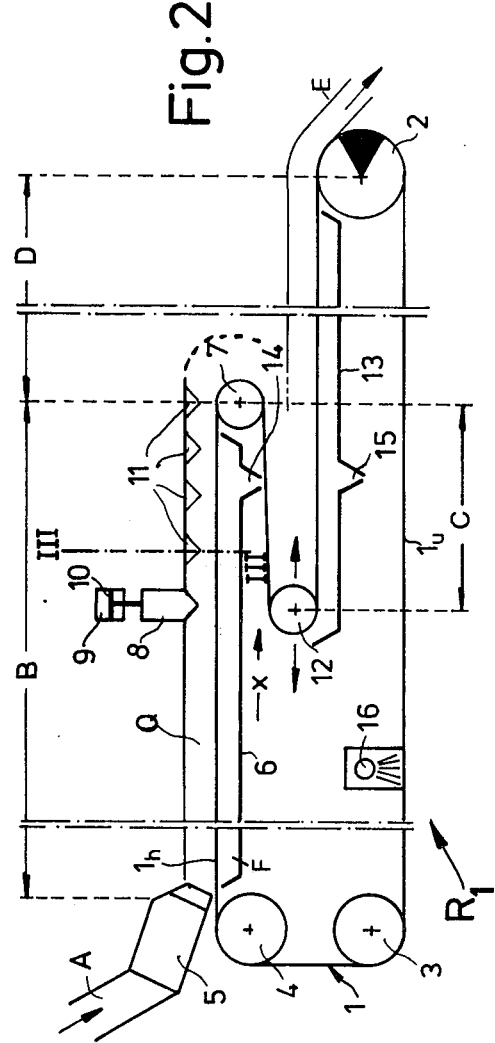

2

DEVICE FOR DEWATERING SLUDGE

FIELD OF THE INVENTION

The invention relates to a band filter device for continuously dewatering a suspension, sewage sludge in particular, the said device having an upper filter band stretched over deflection rolls with the upper part forming a filtering zone, and also having a further filter band and a compression zone between the two filter bands.

PRIOR ART

Such a device is known from U.S. Pat. No. 3,800,952; this device dewaters sludge in a compression zone between the upper strand of an endless filter band at the bottom and the lower strand of a filter band disposed above and parallel to the filter band forming the lower strand of the compression zone. The upper strand of the upper filter band serves as a filter zone for the sludge deposited onto is.

Such band filter devices, in which the filtrate from the suspension or sludge charged onto them runs under the force of gravity through the mesh of the filter band while the suspended solids deposit themselves on the band and are removed, are employed for the filtration of easily dewaterable materials, or as a preliminary step before filter band pressing and similar filtering equipment with greater dewatering capacity.

The filtering capacity and efficiency of these band filter devices is limited by resistance of solid particles sedimented on to the filter band to the passage of filtrate from the upper volumes of the suspension.

To improve the gravity filtration on filter bands, suction units are often provided below the bands. This, however, leads to a marked increase in equipment costs, raises energy consumption and increases the wear of the filter band. It is also known to remove the sedemented solids from the filter band, or to break up the layer of solids with scrapers, ploughshaves or wobble plates on rotating shafts, in order to provide free passage for the filtrate to the filter band. From the technical standpoint implementing such equipment is very involved and the effect produced is limited to the immediately surrounding region. Often it leads to smearing of the band.

SUMMARY OF THE INVENTION

It is therefore an object of the invention to improve the known band filter device such that the above mentioned disadvantages are avoided, to improve the effectiveness of the device, and especially to lower the costs. In particular, the efficiency of the filter zone should be increased.

These objects are achieved by means of the invention in that the filter band in the filter zone forms a Z-shaped step at least once by means of at least one other deflection roll being positioned lower and downstream of the first deflection roll but in a position counter to the direction of transport and such that, between two filter zones, there is zone where the sludge cake is transferred to another part of the band and rearranged.

It is a feature of the invention that the means for collecting the filtrate in the filter zones passes the filtrate on as rinsing water to the part of the band below it; in this respect it has been found particularly favorable to provide a run out from the filtrate trough above the middle of the three lengths of band where the band forms a step.

According to the invention, it has also been found very favorable to provide above the upper strand at least one ram or beam which is positioned transverse to the direction of transport and in terms of the direction of transport before the first deflection roll, and such that it can be pressed into the sludge cake to form transverse groves or channels which will allow the surface water to drain off. The ram is activated by means of a drive connected mechanically or via a medium to the ram. If the grooves are pressed into the cake just before the Z-shaped step, then a particularly high degree of dewatering is achieved; the fluid in the upper part of the cake, for which the passage to the filter band is blocked by the compact lower layer, can flow in the the grooves or channels through the edge regions of the filter band which are not blocked with sludge. After the cake is subsequently thrown over the Z-shaped step, this fluid which has been drained off is no longer able to mix with the previously dewatered lower layer, which increases the efficiency further.

This device now makes it possible to turn or reamange the sludge cake on the filter band at least once and, if desired to provide the cake with channels which run transverse to the direction of transport to lead the surface water off to the sides of the filter band.

BRIEF DESCRIPTION OF THE DRAWINGS

Further advantages, features and details of the invention emplified embodiments and with the appended drawings; wherein:

FIG. 2 is a corresponding view of another embodiment of the invention.

DETAILED DESCRIPTION

Figure 1:
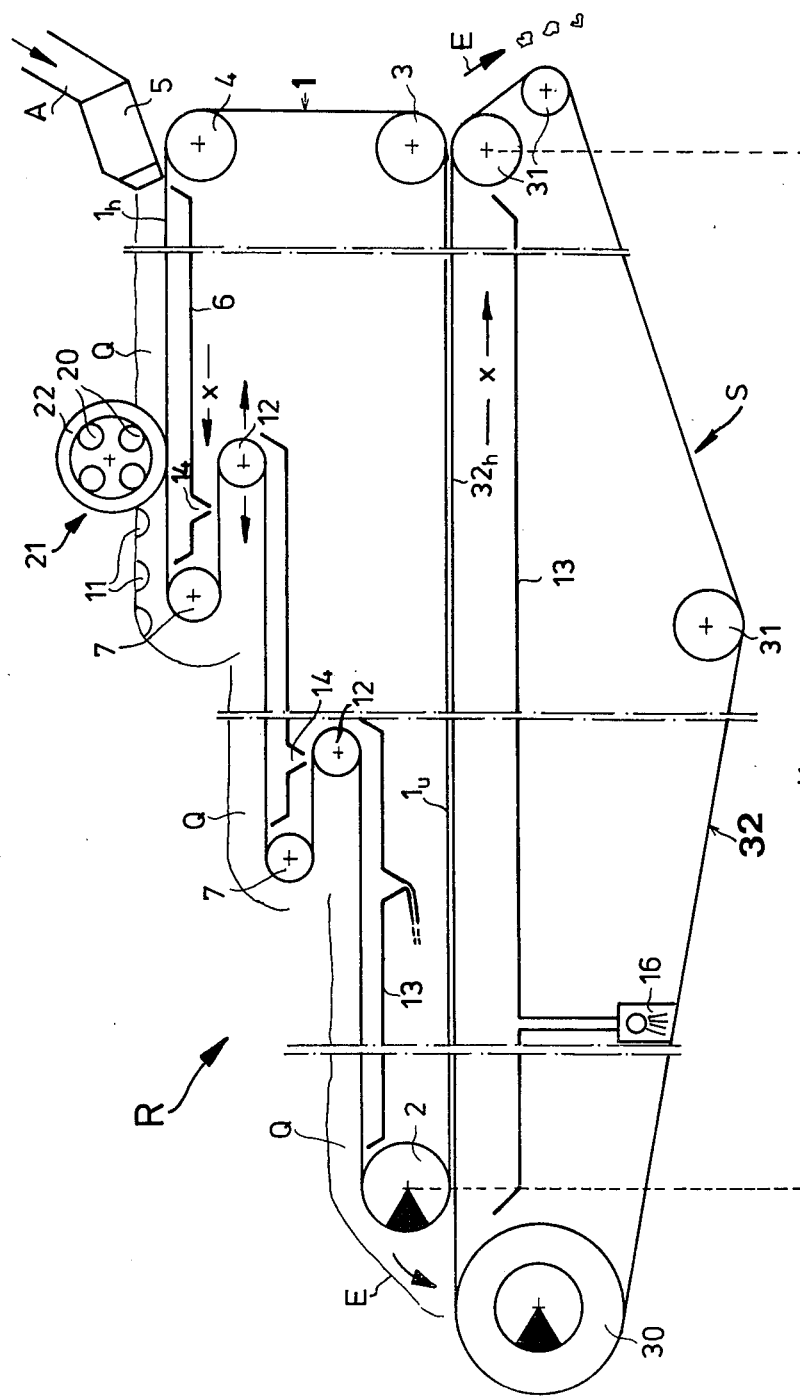
FIG. 1 is a schematic side view of a band filter device for dewatering sludge

FIG. 1 shows a band filter device R for dewatering sludge featuring a compression unit S of conventional type for example shown in U.S. Pat. No. 3,906,853, as a filter band press having a filter band under tension running over a drum 30, which drives the band 32, and deflection rolls 31. A cake of sludge is compressed in the main compression zone K between the upper strand 32$h$ of unit S and the lower strand $1_u$ of another filter band 1.

The dewatering device R, shown in FIG. 2 likewise includes an endless filter band 1 which is advanced by a drive roll 2 and is charged with suspension on the upper of two deflection rolls 3, 4 via feed chute S at A. On filter band 1 this suspension forms a sludge cake Q from which filtrate F is expressed and collected in trough 6.

A further deflection roll 7, downstream in the direction of transport x, delimits a first filter zone B. Near the roll 7, there is a ram 8 situated above the upper strand $1_h$ of filter band 1; this ram 8 is moved up and down at regular intervals by a piston 10 in a cylinder 9, and with each downward movement presses into the cake Q forming a channel 11 which extends from the center of the band to both sides. The fluid concentrated in the upper part of the cake Q collects therein channels 11 and flows in these to the edges of the band.

The filter band 1 is deflected into a Z shape around roll 7 and, in the direction of transport x, a subsequent roll 12 (zone C). The cake Q is thrown over the step thees formed onto a second filter zone D, as a result of which the structure of the cake changes and there is a significant increase in the amount of filtrate released;

this latter amount of filtrate is caught in a further trough 13. The filtered sludge cake Q is descharged at E.

The filtrate from the first filter zone B runs through a slit 14 in the first trough 6 onto the return stretch of the filter band 1 between deflection rolls 7 and 12 where it serves to clean the band 1 of any sludge particles adhering thereto. In the same way, the filtrate F from the second filter zone D can be passed through a slit 15 in the trough 13 onto the returning lower strand $1_u$ of band 1 and used forrinsing it. In case the cleaning with filtrate F is inadequate, a spray pipe 16 is provided to clean the cloth.

Deflection roll 3 can be adjusted to ensure that the band 1 runs centrally; if one of the deflection rolls 7 or 12 is used to create tension, then an additional tensioning roll can be omitted.

In the embodiment of the invention shown in FIG. 1, edge disco 22 are provided and on the discs are mounted round rods or pipes 20 such that they form a cage 21, which is made up of double cones of increasing diameter from the middle of the band towards the edges, and the double cone rods from channels 11 in the sludge cake Q which channels slope from the middle of the band to the edges. The edge disco 22 run with their circumference on strips at the edges of the filter band which causes them to rotate.

What is claimed is:

1. Apparatus for continuously dewatering a suspension comprising a driven filter band, deflection roll means supporting said band and forming an upper strand therefor, means for depositing suspension on said upper strand which serves as a filter so that a dewatered cake is formed on said upper strand, said deflection roll means including a first deflection roll on which said upper strand passes and is reversed in direction at a downstream end of said upper strand and a second deflection roll located below and downstream of said first deflection roll, said band traveling from said first roll to said second roll in opposite direction to the direction of travel of said upper strand and then passing around said second roll to travel along an intermediate length in the same direction as said upper strand, said first deflection roll being located above said intermediate length and forming with said second deflection roll a Z-shaped step for said band such that said cake is transported by said upper strand over said first deflection roll onto said intermediate length while undergoing turning and transport on said intermediate length in the same direction as on said upper strand.

2. Apparatus as claimed in claim 1 comprising a driven lower filter band, the first said driven band having a lower strand facing an upper strand of said lower filter band to form a compression zone for said cake.

3. Apparatus as claimed in claim 1 comprising means for collecting filtrate from said suspension on said upper strand.

4. Apparatus as claimed in claim 3 wherein said means for collecting filtrate comprises a trough located below said upper strand upstream of said first deflection roll, said trough having an outlet facing said intermediate length.

5. Apparatus as claimed in claim 4 wherein said band includes a second intermediate length located downstream of the first intermediate length, a lower strand located downstream of said second intermediate length, and a second trough located below said second intermediate length and having an outlet located above said lower strand.

6. Apparatus as claimed in claim 1 wherein one of said deflection rolls constitutes a tensioning roll.

* * * * *